(12) United States Patent
Wang

(10) Patent No.: US 9,360,099 B2
(45) Date of Patent: Jun. 7, 2016

(54) V-PULLEY

(71) Applicant: Jinfang Wang, Zhejiang (CN)

(72) Inventor: Jinfang Wang, Zhejiang (CN)

( * ) Notice: Subject to any disclaimer, the term of this patent is extended or adjusted under 35 U.S.C. 154(b) by 0 days.

(21) Appl. No.: 14/397,623

(22) PCT Filed: May 22, 2013

(86) PCT No.: PCT/CN2013/076037
§ 371 (c)(1),
(2) Date: Oct. 28, 2014

(87) PCT Pub. No.: WO2014/048123
PCT Pub. Date: Apr. 3, 2014

(65) Prior Publication Data
US 2015/0133248 A1 May 14, 2015

(30) Foreign Application Priority Data

Sep. 29, 2012 (CN) .......................... 2012 1 0375570
Sep. 29, 2012 (CN) .......................... 2012 1 0376431

(51) Int. Cl.
*F16H 55/30* (2006.01)
*F16H 55/36* (2006.01)
*F16H 55/17* (2006.01)
*F16H 55/49* (2006.01)

(52) U.S. Cl.
CPC .............. *F16H 55/171* (2013.01); *F16H 55/49* (2013.01)

(58) Field of Classification Search
CPC ....... F16H 55/171; F16H 55/36; F16H 55/30; F16H 7/023; B65G 23/06
USPC .......................................... 474/152, 166, 164
See application file for complete search history.

(56) References Cited

U.S. PATENT DOCUMENTS

| 465,141 | A | * | 12/1891 | McCray | .................. | F16H 55/30 474/156 |
| 1,841,925 | A | * | 1/1932 | Woodbury | .............. | F16G 13/02 474/156 |

(Continued)

FOREIGN PATENT DOCUMENTS

| CN | 101551001 A | 10/2009 |
| CN | 101649882 A | 2/2010 |

(Continued)

OTHER PUBLICATIONS

International Search Report dated Sep. 5, 2013 for Application No. PCT/CN2013/076037.

*Primary Examiner* — Henry Liu
(74) *Attorney, Agent, or Firm* — Tim Tingkang Xia, Esq.; Locke Lord LLP

(57) ABSTRACT

A V-pulley includes a pulley body having a through hole provided at the center. Wheels are connected on the pulley body. An outer wheel is provided at each of two ends of the pulley body. Coaxial annular gears and annular inner wheels are alternately arranged between the two outer wheels. The diameter of a gear is less than that of an inner wheel. The outer wheels, the gears, and the inner wheels are fixedly connected through a connecting structure. The outer circumferential surfaces of the gears have meshing teeth disposed at an interval in a convex-concave manner. Two adjacent wheels and a gear between them form a V-belt groove. The opposite end surfaces of the two adjacent wheels form friction transmission belt groove side surfaces. The gear between the two adjacent wheels forms a mesh transmission gear. The belt groove side surfaces are inclined smooth surfaces.

10 Claims, 13 Drawing Sheets

(56) References Cited

U.S. PATENT DOCUMENTS

| | | | | |
|---|---|---|---|---|
| 2,198,787 A | * | 4/1940 | Nystrom | F16H 55/36 474/168 |
| 2,374,644 A | * | 5/1945 | Bombardier | F16H 55/30 305/197 |
| 2,412,114 A | * | 12/1946 | Zonis | D05B 69/30 474/153 |
| 2,933,934 A | * | 4/1960 | Haroldson | F16H 55/36 254/390 |
| 3,346,158 A | * | 10/1967 | Hanson | G03B 21/321 226/108 |
| 3,375,725 A | * | 4/1968 | Mathison | F16H 55/38 474/153 |
| 4,013,142 A | * | 3/1977 | Hagg | B66B 15/04 187/254 |
| 4,072,062 A | * | 2/1978 | Morling | A01D 45/023 198/494 |
| RE30,341 E | * | 7/1980 | Lapeyre | F16H 55/30 198/834 |
| 4,218,932 A | * | 8/1980 | McComber | F16H 7/023 180/9.62 |
| 4,486,183 A | * | 12/1984 | Posiviata | F16D 3/68 267/148 |
| 4,488,671 A | * | 12/1984 | Hamisch, Jr. | B65C 11/0247 156/384 |
| 4,559,029 A | * | 12/1985 | Miranti, Jr. | F16G 5/00 474/205 |
| 4,676,767 A | * | 6/1987 | Ahlgren | G09F 11/025 474/84 |
| 4,810,237 A | * | 3/1989 | Mantovaara | F16H 9/12 474/166 |
| 5,417,617 A | * | 5/1995 | Milton | F16H 55/171 474/205 |
| 5,792,294 A | * | 8/1998 | Randazzo | B29C 65/00 156/158 |
| 5,947,265 A | * | 9/1999 | Merten | B65G 23/06 198/834 |
| 6,070,713 A | * | 6/2000 | Eichmann | B21D 43/12 198/834 |
| 6,719,127 B2 | * | 4/2004 | Depaso | B65G 17/08 198/834 |
| 6,932,732 B2 | * | 8/2005 | Linck | F16H 7/023 29/892 |
| 7,871,347 B2 | * | 1/2011 | Kamada | B62M 9/10 474/152 |
| 8,398,512 B2 | * | 3/2013 | Dickinger | F16H 55/171 474/164 |
| 2005/0064972 A1 | * | 3/2005 | Rusheidat | F16H 55/171 474/168 |
| 2006/0240927 A1 | * | 10/2006 | Grimm | F16H 47/04 474/166 |
| 2008/0153646 A1 | * | 6/2008 | Lam | B21K 1/30 474/168 |
| 2009/0093328 A1 | * | 4/2009 | Dickinger | F16H 55/171 474/152 |
| 2010/0190597 A1 | * | 7/2010 | Fink | B61B 12/105 474/169 |
| 2012/0094795 A1 | * | 4/2012 | Wang | F16G 1/28 474/153 |

FOREIGN PATENT DOCUMENTS

| | | |
|---|---|---|
| CN | 201496511 U | 6/2010 |
| CN | 101832373 A | 9/2010 |
| WO | 2011145017 A | 11/2011 |

* cited by examiner

V-PULLEY

FIELD OF THE INVENTION

The present invention relates to a pulley, and more particularly, to a V-pulley that is easy to mount and has desirable strength, a long service life, and high transmission efficiency.

BACKGROUND OF THE INVENTION

In the related art, a force is generally transmitted between a V transmission belt and a pulley through sliding friction. In the process of practical use, a belt is stretched and deformed to some extent. When a smaller driving pulley drives a larger driven pulley, the wrap angle of the large pulley is greater than that of the small pulley, so that a slippage phenomenon is likely to occur between the belt and the smaller pulley. Especially in a working condition of high power and heavy load, the slippage phenomenon is more obvious. To overcome the slippage phenomenon, a V belt transmission system having belt mesh transmission has been designed. Such a belt pulley includes a pulley body provided with a belt groove. The pulley body is integrally formed. Next, convex-concave teeth are cast in the belt groove of the pulley body. The pulley body is cast using gray cast iron. The convex-concave teeth are cast by using an aluminum material. During use of the pulley, the convex-concave teeth wear easily, and the convex-concave teeth are relatively low in strength and a fracture phenomenon occurs easily. Special molds need to be designed to cast the pulley body and the convex-concave teeth, thus the manufacturing cost is high. Especially, in the process of casting the convex-concave teeth, the required molds are complex in structure, and manufacturing cost is greatly increased.

Chinese Patent Publication No. CN201496512U discloses a pulley. Several evenly distributed wheel grooves are provided on the pulley. Continuously distributed convex-concave teeth are provided in the wheel grooves. The pulley is integrally formed through casting. The convex-concave teeth are cast at groove bottoms of the wheel grooves. During use of the pulley, the convex-concave teeth wear easily, the convex-concave teeth are relatively low in strength, the service life of the pulley is short, and the manufacturing cost is high.

SUMMARY OF THE INVENTION

In one aspect, the present invention overcomes deficiencies that an existing V pulley wears easily and has a short service life and a high manufacturing cost, and provides a V shaped pulley (V-pulley). During use of the V-pulley, a belt is unlikely to slip, the pulley does not wear easily, and the pulley has desirable strength, a long service life, and a low manufacturing cost.

In one embodiment, the present invention relates to a V-pulley. The V-pulley includes a pulley body. A through hole is provided at the center of the pulley body. Wheels are connected on the pulley body. The wheels include outer wheels and inner wheels. An outer wheel is provided at each of the two ends of the pulley body. Coaxial annular gears and annular inner wheels are alternately arranged between the two outer wheels. The diameter of the gears is less than that of the inner wheels. The outer wheels, the gears, and the inner wheels are fixedly connected through a connecting structure. The outer circumferential surfaces of the gears are provided with meshing teeth disposed at an interval in a convex-concave manner. Two adjacent wheels and a gear located between the two adjacent wheels form a V-belt groove. The opposite end surfaces of the two adjacent wheels form friction transmission belt groove side surfaces. The gear between the two adjacent wheels forms a mesh transmission gear. Side surfaces of the belt groove are inclined smooth surfaces.

The V-belt groove includes the side surfaces of the belt groove used for friction transmission and the meshing teeth used for mesh transmission. A V belt having meshing teeth is assembled in the V-belt groove. During transmission, a combined transmission manner of friction transmission of the belt groove side surfaces and mesh transmission of the meshing teeth is implemented. The force and torque of transmission are significantly increased, and the pulley is especially suitable for use in an environment of high power and heavy load. Because the belt enhances mesh transmission, a slippage phenomenon is unlikely to occur between the belt and the pulley, the wear of the pulley and the wear of the belt are reduced, and the service life of the pulley and the service life of the belt are increased. The V-pulley is assembled by the pulley body, the wheels, and the gears. The pulley body, the wheels, and the gears are separately machined and manufactured. The pulley body, the wheels, and the gears have desirable strength and are wear resistant. The wheels are mounted on the pulley body piece by piece, so that stress concentration, which locates at a connection position between the wheels and the pulley body when the wheels and the pulley body are integrally formed, does not occur. The wheels are sleeved on the pulley body, so that fracture is unlikely to occur. The pulley body, the wheels, and the gears are manufactured separately, complex mold design required for integrally forming the pulley is avoided, and manufacturing cost of the pulley is reduced.

The connecting structure used for connecting the outer wheels, the inner wheels, and the gears has various forms. In one embodiment, the inner wheels, the gears, and the outer wheels may be sleeved on the pulley body, and connected and fixed into a whole through axial screws. Then, connecting holes disposed axially on the outer wheels and connecting holes disposed axially on the pulley body are connected through a screw, so that the inner wheels, the gears, and the outer wheels are tightly connected on the pulley body. In another embodiment, the inner wheels, the gears, and the outer wheels may also be sleeved on the pulley body, and are connected and fixed into a whole through an axial screw. Then, the outer wheels are soldered at two ends of the pulley body.

In a first preferred embodiment, a connecting structure includes several connecting concave grooves and several connecting through holes disposed on the pulley body, several bosses disposed on the inner wheels and the gears, several fixing holes disposed on the outer wheels, and a connecting piece for connection and fixation. The connecting concave grooves are axially disposed on the outer wall of the pulley body, and the bosses and the connecting concave grooves are disposed in a one-to-one corresponding manner on inner circumferential surfaces of the gears and the inner wheels. The bosses and the connecting concave grooves are connected in a matching manner. The fixing holes are correspondingly disposed on end surfaces of the two outer wheels. The connecting through holes are disposed on the pulley body and correspond to the fixing holes one by one. The connecting piece is connected and fixed in the connecting through holes and the fixing holes. The fixing holes and the connecting through holes coaxially correspond to each other one by one. During connection, the inner wheels and the gears are sleeved on the pulley body, and the bosses are connected in the connecting concave grooves in a one-to-one corresponding and matching manner. The matching and connection between the bosses and the connecting concave grooves prevent the inner wheels and the gears from rotating about the pulley body. Next, the two outer wheels are joined on two end surfaces of the pulley body, the two outer wheels are connected on the pulley body through the connecting piece, and two end surfaces of the gears and end surfaces of the wheels are joined and abut each other, so as to prevent the inner wheels and the gears from axial displacement. After being connected, the wheels and the gears neither displace axially nor rotate axially, so as to ensure the stability and reliability of the pulley during use. The connecting structure is convenient and fast in connection. The bosses, instead of concave grooves, are disposed on inner circular surfaces of the gears and the inner wheels for position limiting, and the bosses increase the strength at the position.

In one embodiment, the connecting through holes are evenly disposed, the connecting piece is a rivet, and the connecting through holes and the connecting concave grooves have an included angle along an axial direction of the pulley body. The evenly disposed connecting through holes, after the outer wheels and the pulley body are connected, ensure stable force application on the outer wheels and the pulley body. The rivet is used as the connecting piece for stable connection. The connecting through holes and the connecting concave grooves have an included angle along an axial direction of the pulley body instead of being disposed in a same axial direction, so as to prevent the strength of the pulley body from being reduced because of an excessively small wall thickness of the pulley body.

In one embodiment, a concave triangular mark groove is provided at the bottom of one of the connecting concave grooves on the pulley body, and a concave triangular mark groove is provided on an end surface of a boss that is mated with the connecting concave groove having the mark groove. When the inner wheels, the gears, and the pulley body are assembled and connected, the boss having the mark groove and the connecting concave groove having the mark groove are correspondingly connected, so as to ensure axial one-to-one correspondence of the meshing teeth on the gears, thereby preventing misalignment of the meshing teeth of different gears.

In one embodiment, the number of the connecting concave grooves disposed on the pulley body is four. A first connecting concave groove and a second connecting concave groove are symmetrically disposed on a same diameter of the pulley body. A third connecting concave groove is disposed at the symmetrical line between the first connecting concave groove and the second connecting concave groove. A fourth connecting concave groove deviates by 1 to 5 degrees from the symmetrical line between the first connecting concave groove and the second connecting concave groove. The four connecting concave grooves are not evenly disposed on the pulley body. One of the connecting concave grooves deviates by a small angle from an even distribution position. The bosses connected to the connecting concave grooves in a one-to-one corresponding manner are also not evenly distributed. One of the bosses deviates by a small angle from an even distribution position. In the process of sleeving the gears and the inner wheels on the pulley body, there is only one correct angle for sleeving on the pulley body. In comparison, if the connecting concave grooves are evenly disposed, all of the four bosses on the inner wheels and the gears can match and be connected to one same connecting concave groove. Thus, four assembly angles exist, and misalignment of the meshing teeth on different gears is very likely to occur. The design of the connecting concave grooves of the present invention prevents the misalignment of the meshing teeth on different gears on the pulley body.

One of the two outer wheels is a first outer wheel, and the other is a second outer wheel. In another preferred embodiment, a connecting structure includes several fixing holes and several wheel body through grooves disposed on the pulley body, several connecting holes and several positioning grooves disposed on the first outer wheel, several positioning holes disposed on the second outer wheel, several gear body through grooves disposed on the inner wheels and the gears, a connecting piece used for connection and fixation, and a positioning piece used for positioning. Several position limiting grooves are provided on an end surface on a side of the pulley body. The fixing holes are disposed on the bottom surfaces of the position limiting grooves, respectively. Several connecting blocks axially mating with the position limiting grooves are provided on an inner circle of the first outer wheel that is located on a side provided with the position limiting grooves of the pulley body. The connecting holes are disposed on the connecting blocks, respectively. The connecting piece is connected in the fixing holes and the connecting holes. The second outer wheel located on the other side of the pulley body is integrally formed with the pulley body. The wheel body through grooves and the gear body through grooves all have concave semi-circular shapes and are disposed opposite to each other correspondingly one by one. The positioning grooves, the wheel body through grooves, and the positioning holes are disposed in a one-to-one corresponding manner. The positioning piece is connected and disposed in the positioning grooves, the wheel body through grooves, and the positioning holes. The second outer wheel is integrally formed with the pulley body. The inner wheels and the gears are sleeved on the pulley body. The wheel body through grooves and the gear body through grooves are disposed correspondingly to form circular through holes. The circular through holes coaxially correspond to the positioning holes one by one. The positioning piece is inserted from the position of the positioning groove of the second outer wheel, passes through the circular through holes, and comes out from the positioning holes. The outer wall of the positioning piece is joined to the wheel body through grooves and the gear body through grooves, so as to prevent the inner wheels and the gears from rotating about the pulley body. The connecting blocks on the first outer wheel are mated to the position limiting grooves on an end surface of the pulley body are. The connecting piece passes through the connecting holes and the fixing holes to connect and fix together the first outer wheel and the pulley body. Two end surfaces of the gears are both joined to and abut end surfaces of the wheels, so as to prevent axial displacement of the gears and wheels.

In one embodiment, the position limiting grooves are evenly disposed, the connecting piece is a fixing bolt, the positioning piece is a positioning pin, and a position limiting spring is sleeved at a front end of the positioning pin. The position limiting grooves are evenly disposed, so as to ensure stable force application on the first outer wheel and the pulley body after the first outer wheel and the pulley body are connected. The fixing bolt is used as the connecting piece for convenient and stable connection. The position limiting spring prevents axial displacement of the positioning pin.

In one embodiment, the outer wheels, the gears, and the inner wheels are all manufactured and machined by powder metallurgy, iron casting, or alloy steel casting. Parts manufactured through powder metallurgy have desirable strength and hardness and do not wear easily, thereby greatly increasing the service life of the outer wheels, the gears, and the inner wheels. Parts manufactured through iron casting have low cost. Parts manufactured through alloy steel casting have desirable hardness and are wear resistant. It is flexible and convenient to select a suitable manufacturing and machining manner according to varies requirements.

In one embodiment, two end surfaces of the inner wheels include an annular wheel joining surface and an annular wheel inclined surface connected together. The end surfaces near the gears of the outer wheels include an annular wheel joining surface and an annular wheel inclined surface connected together. The wheel inclined surfaces form the belt groove side surfaces. Two end surfaces of the gears include an annular gear joining surface and an annular gear inclined surface connected together. The gear inclined surfaces are disposed on side surfaces of the meshing teeth of the gears. The gear joining surfaces and the wheel joining surfaces are both smooth surfaces and are joined together. The gear inclined surface is joined to a part of the wheel inclined surface near the position of a joining surface of the wheel. Such a structural design enables entire end surfaces at two ends of the gears and the end surfaces of the wheels to be joined, so that end surfaces on two sides of the meshing teeth are joined to the end surfaces of the wheels, making the meshing teeth uneasy to deform.

In one embodiment, 2 to 200 gears are connected on the pulley body. The pulley body, the outer wheels, the inner wheels, and the gears together form a 2-200-joined pulley. A joining number of a joined pulley is selected according to needs, so as to satisfy different use requirements and provide flexibility and convenience.

In another aspect, a V-pulley includes a pulley body. Wheels are connected on the pulley body. The wheels include outer wheels and inner wheels. An outer wheel is provided at two ends of the pulley body, respectively. Coaxial annular connecting sheets and annular inner wheels are alternately arranged between the two outer wheels. The diameter of a connecting sheet is less than the diameter of an inner wheel. The outer wheels, the connecting sheets, and the inner wheels are fixedly connected through a connecting structure. A rough friction layer is provided on both opposite end surfaces of adjacent wheels. Two adjacent wheels and a connecting sheet located between the two adjacent wheels form a V-belt groove. The end surfaces of the two adjacent wheels form friction transmission belt groove side surfaces. The belt groove side surfaces are inclined surfaces.

The friction layer is machined by using a shot blasting process. The connecting sheets are gears. The outer circumferential surfaces of the gears are provided with meshing teeth disposed at an interval in a convex-concave manner. The gear between the two adjacent wheels forms a mesh transmission gear.

The V-belt groove includes the belt groove side surfaces used for friction transmission and the meshing teeth used for mesh transmission. A V belt having meshing teeth is assembled in the V-belt groove. During transmission, a combined transmission manner of friction transmission of the belt groove side surfaces and mesh transmission of the meshing teeth is implemented. Also, a rough friction layer is provided on both opposite end surfaces of adjacent wheels respectively. That is, a rough friction layer is disposed on the side surfaces for friction transmission of the belt groove and a belt, and therefore a friction coefficient is large, the force and torque of transmission are significantly increased, the pulley is especially suitable for use in an environment of high power and heavy load, and transmission efficiency is high. Because mesh transmission and a rough friction layer are added to the belt, a slippage phenomenon becomes unlikely to occur between the belt and the pulley, the wear of the pulley and the wear of the belt are reduced, and the service life of the pulley and the service life of the belt are increased.

The V-pulley is connected and assembled by the pulley body, the wheels, and the gears. The pulley body, the wheels, and the gears are separately machined and manufactured. The pulley body, the wheels, and the gears have desirable strength and are wear resistant. The wheels are mounted on the pulley body piece by piece, so that stress concentration, which locates at a connection position between the wheels and the pulley body when the wheels and the pulley body are integrally formed, does not occur. The wheels are sleeved on the pulley body, so that fracture is unlikely to occur. The pulley body, the wheels, and the gears are manufactured separately, complex mold design needed for integrally forming the pulley is avoided, and manufacturing cost of the pulley is reduced. The friction layer machined through the shot blasting process on the surface of the wheel increases a friction coefficient and also enhances a fatigue resistance capability and a fracture resistance capability of wheels, thereby increasing the service life of the wheels.

In one embodiment, two end surfaces of the inner wheels include an annular wheel joining surface and an annular wheel inclined surface connected together. The end surfaces near the gears of the outer wheels include an annular wheel joining surface and an annular wheel inclined surface connected together. The wheel inclined surfaces form the belt groove side surfaces. Two end surfaces of the gears include an annular gear joining surface and an annular gear inclined surface connected together. The gear inclined surfaces are disposed on side surfaces of the meshing teeth of the gears. The gear joining surfaces and the wheel joining surfaces are both smooth surfaces and are joined together. The gear inclined surface is joined to a part of the wheel inclined surface near the position of a joining surface of the wheel. A friction layer is disposed on both the wheel joining surfaces and the wheel inclined surfaces. Such a structural design enables entire end surfaces at two ends of the gears and the end surfaces of the wheels to be joined, so that end surfaces on two sides of the meshing teeth are joined to the end surfaces of the wheels, making the meshing teeth uneasy to deform.

The connecting structure used for connecting the outer wheels, the inner wheels, and the gears has various forms. In one embodiment, the inner wheels, the gears, and the outer wheels may be sleeved on the pulley body, and the inner wheels, the gears, and the outer wheels are connected and fixed into a whole through axial screws. Next, connecting holes disposed axially on the outer wheels and connecting holes disposed axially on the pulley body are connected through screws, so that the inner wheels, the gears, and the outer wheels are tightly connected on the pulley body. In another embodiment, the inner wheels, the gears, and the outer wheels may also be sleeved on the pulley body, and the inner wheels, the gears, and the outer wheels are connected and fixed into a whole through an axial screw. Next, the outer wheels are soldered at two ends of the pulley body.

In a first preferred embodiment, a connecting structure includes several connecting concave grooves and several connecting through holes disposed on the pulley body, several bosses disposed on the inner wheels and the gears, several fixing holes disposed on the outer wheels, and a connecting piece for connection and fixation. The connecting concave grooves are axially disposed on the outer wall of the pulley body, the bosses and the connecting concave grooves are disposed in a one-to-one corresponding manner on inner circumferential surfaces of the gears and the inner wheels. The bosses and the connecting concave grooves are connected in a matching manner. The fixing holes are correspondingly disposed on end surfaces of the two outer wheels. The connecting through holes are disposed on the pulley body and correspond to the fixing holes one by one. The connecting piece is connected and fixed in the connecting through holes and the fixing holes. The fixing holes and the connecting through holes coaxially correspond to each other one by one. During connection, the inner wheels and the gears are sleeved on the pulley body, and the bosses are connected in the connecting concave grooves in a one-to-one corresponding and matching manner. The matching and connection between the bosses and the connecting concave grooves prevent the inner wheels and the gears from rotating about the pulley body. Next, the two outer wheels are joined on two end surfaces of the pulley body, the two outer wheels are connected on the pulley body through the connecting piece, two end surfaces of the gears and end surfaces of the wheels are joined and abut each other, so as to prevent the inner wheels and the gears from axial displacement. After being connected, the wheels and the gears neither displace axially nor rotate axially, so as to ensure the use stability and reliability of the pulley. The connecting structure is convenient and fast in connection, and the bosses, instead of concave grooves, are disposed on inner circular surfaces of the gears and the inner wheels for position limiting, so that the bosses increase the strength at the position.

In one embodiment, the connecting through holes are evenly disposed. The connecting piece is a rivet. The connecting through holes and the connecting concave grooves have an included angle along an axial direction of the pulley body. The evenly disposed connecting through holes ensure stable force application on the outer wheels and the pulley body after the outer wheels and the pulley body are connected. The rivet is used as the connecting piece for ensure stable connection. The connecting through holes and the connecting concave grooves have an included angle along an axial direction of the pulley body instead of being disposed in a same axial direction, so as to prevent the strength of the pulley body from being reduced because of an excessively small wall thickness of the pulley body.

In one embodiment, a concave triangular mark groove is provided at the groove bottom of one of the connecting concave grooves on the pulley body, and a concave triangular mark groove is provided on an end surface of a boss mated with the connecting concave groove with the mark groove. When the inner wheels, the gears, and the pulley body are assembled and connected, the boss provided with the mark groove and the connecting concave groove provided with the mark groove are correspondingly connected, so as to ensure axial one-to-one correspondence of the meshing teeth on the gears, thereby preventing misalignment in the meshing teeth of different gears.

In one embodiment, the number of the connecting concave grooves disposed on the pulley body is four. A first connecting concave groove and a second connecting concave groove are symmetrically disposed on a same diameter of the pulley body. A third connecting concave groove is disposed at a symmetrical line between the first connecting concave groove and the second connecting concave groove. A fourth connecting concave groove deviates by 1 to 5 degrees from the symmetrical line between the first connecting concave groove and the second connecting concave groove. The four connecting concave grooves are not evenly disposed on the pulley body. One of the connecting concave grooves deviates by a small angle from an even position. The bosses connected to the connecting concave grooves in a one-to-one corresponding manner are also not evenly disposed. One of the bosses deviates by a small angle from an even position. In the process of sleeving the gears and the inner wheels on the pulley body, there is only one correct angle for sleeving on the pulley body. In comparison, if the connecting concave grooves are evenly disposed, the four bosses on the inner wheels and the gears can all be connected to one same connecting concave groove in a matching manner. Therefore, four assembly angles exist, and misalignment is very likely to occur in the meshing teeth of different gears. The design of the connecting concave grooves of the present invention prevents misalignment in the meshing teeth on different gears on the pulley body.

One of the two outer wheels is a first outer wheel, and the other is a second outer wheel. Another preferred connecting structure includes several fixing holes and several wheel body through grooves disposed on the pulley body, several connecting holes and several positioning grooves disposed on the first outer wheel, several positioning holes disposed on the second outer wheel, several gear body through grooves disposed on the inner wheels and the gears, a connecting piece used for connection and fixation, and a positioning piece used for positioning. Several position limiting grooves are provided on an end surface on a side of the pulley body. The fixing holes are disposed on the bottom surfaces of the position limiting grooves, respectively. Several connecting blocks axially connected to the position limiting grooves in a matching manner are provided on an inner circle of the first outer wheel that is located on a side provided with the position limiting grooves of the pulley body. The connecting holes are disposed on the connecting blocks, respectively. The connecting piece is connected in the fixing holes and the connecting holes. The second outer wheel located on the other side of the pulley body is integrally formed with the pulley body. The wheel body through grooves and the gear body through grooves all have concave semi-circular shapes and are disposed opposite each other one by one. The positioning grooves, the wheel body through grooves, and the positioning holes are disposed in a one-to-one corresponding manner. The positioning piece is connected and disposed in the positioning grooves, the wheel body through grooves, and the positioning holes. The second outer wheel is integrally formed with the pulley body. The inner wheels and the gears are sleeved on the pulley body. The wheel body through grooves and the gear body through grooves are disposed correspondingly to form circular through holes. The circular through holes coaxially correspond to the positioning holes one by one. The positioning piece is inserted from the position of the positioning groove of the second outer wheel, passes through the circular through holes, and comes out from the positioning holes. The outer wall of the positioning piece is joined to the wheel body through grooves and the gear body through grooves, so as to prevent the inner wheels and the gears from rotating about the pulley body. The connecting blocks on the first outer wheel and the position limiting grooves on an end surface of the pulley body are connected in a matching manner. The connecting piece passes through the connecting holes and the fixing holes to connect and fix together the first outer wheel and the pulley body. Two end surfaces of the gears are both joined to and abut end surfaces of the wheels, so as to prevent axial displacement of the gears and wheels.

In one embodiment, the position limiting grooves are evenly disposed. The connecting piece is a fixing bolt. The positioning piece is a positioning pin. A position limiting spring is sleeved at a front end of the positioning pin. The position limiting grooves are evenly disposed, so as to ensure stable force application on the first outer wheel and the pulley body after the first outer wheel and the pulley body are connected. The fixing bolt is used as the connecting piece for convenient and stable connection. The position limiting spring prevents axial displacement of the positioning pin.

In one embodiment, the outer wheels, the gears, and the inner wheels are all manufactured and machined in one manner of powder metallurgy, iron casting, and alloy steel casting. 2 to 200 gears are connected on the pulley body. The pulley body, the outer wheels, the inner wheels, and the gears together form a 2-200-joined pulley. Parts manufactured through powder metallurgy have desirable strength and hardness and do not wear easily, thereby greatly increasing the service life of the outer wheels, the gears, and the inner wheels. Parts machined and manufactured through iron casting have low cost. Parts machined and manufactured through alloy steel casting have desirable hardness and are wear resistant. The manufacturing methods of the outer wheels, the gears, and the inner wheels and a joining number of a joined pulley are selected according to needs, so as to satisfy different use requirements and provide flexibility and convenience.

Compared with the related, the beneficial effects of the present invention, among other things, are as follows: (1) During use of a V-pulley, a combined transmission manner of friction transmission of belt groove side surfaces and mesh transmission of meshing teeth is implemented, the force and torque of transmission are large, slippage is unlikely to occur between a belt and the pulley, and the pulley can satisfy use requirements of high power and heavy load. (2) The V-pulley is assembled by a pulley body, wheels, and gears, so that stress concentration, which locates at a connection position between the wheels and the pulley body when the wheels and the pulley body are integrally formed, does not occur. The wheels are sleeved on the pulley body, so that fracture is unlikely to occur. (3) The pulley body, the wheels, and the gears are connected and assembled conveniently and fast, the wheel and the gears do not displace axially and do not rotate about the pulley body, and position limiting is reliable. (4) Misalignment does not occur in the meshing teeth on different gears on the pulley body, thereby ensuring that the meshing teeth on different gears correspond to each other one by one and are on a same axial straight line, and ensuring synchronization of meshing between the meshing teeth on different gears and meshing teeth on the belt. (5) The wheels and the gears have desirable strength and desirable hardness, and do not wear easily, thereby greatly increasing the service life of the pulley.

In the figures: 1 pulley body, 2 through hole, 3 outer wheel, 4 inner wheel, 5 gear, 6 meshing teeth, 7 belt groove, 8 connecting concave groove, 9 connecting through hole, 10 bosses, 11 fixing hole, 12 rivet, 13 mark groove, 14 fixing hole, 15 wheel body through grooves, 16 connecting holes, 17 positioning groove, 18 positioning hole, 19 gear body through groove, 20 position limiting groove, 21 connecting block, 22 fixing bolt, 23 positioning pin, 24 position limiting spring, 25 wheel joining surface, 26 wheel inclined surface, 27 gear joining surface, 28 gear inclined surface, 29 positioning ring, 30 protruding ring, 31 guiding hole, 32 inner annular body, 33 outer annular body, 34 connecting rib, 35 friction layer, 3-1 first outer wheel, 3-2 second outer wheel.

DETAILED DESCRIPTION OF THE INVENTION

The technical solutions of the present invention are further described in detail below with reference to the specific embodiments and accompanying drawings:

Embodiment 1

Figure 1:
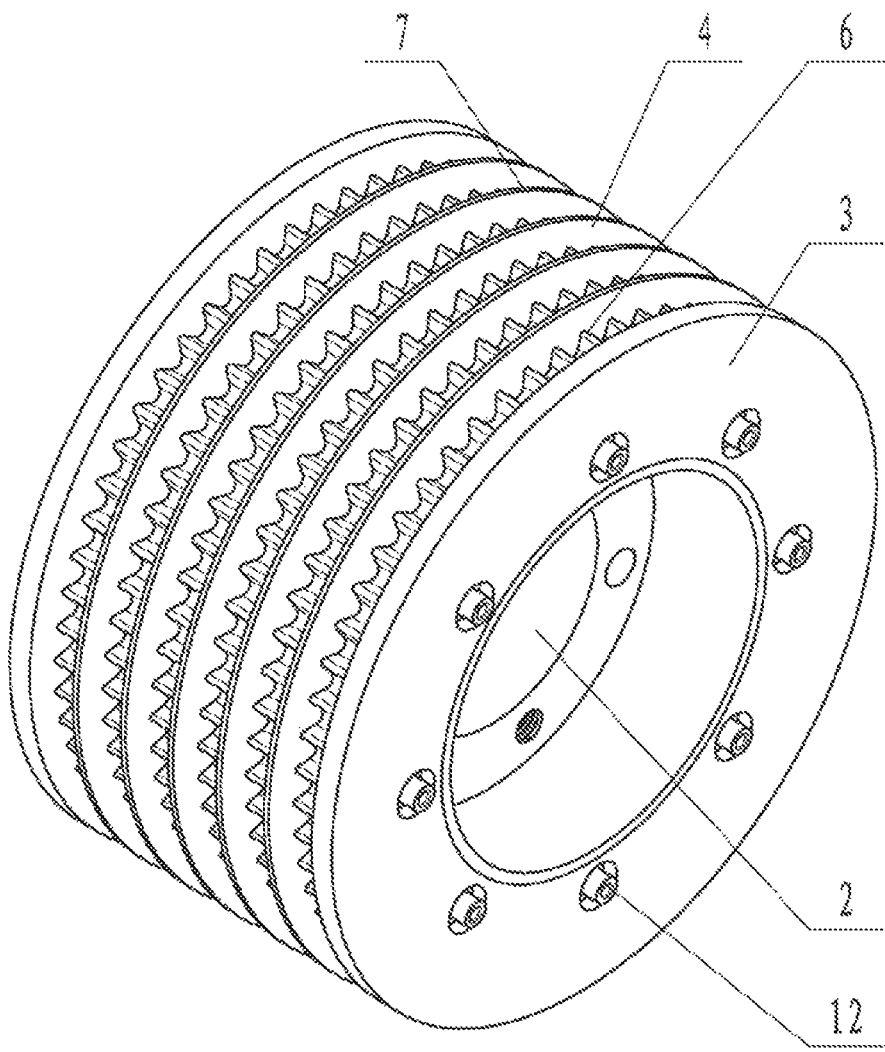
FIG. 1 is a schematic structural diagram according to embodiment 1 of the present invention.
Figure 2:
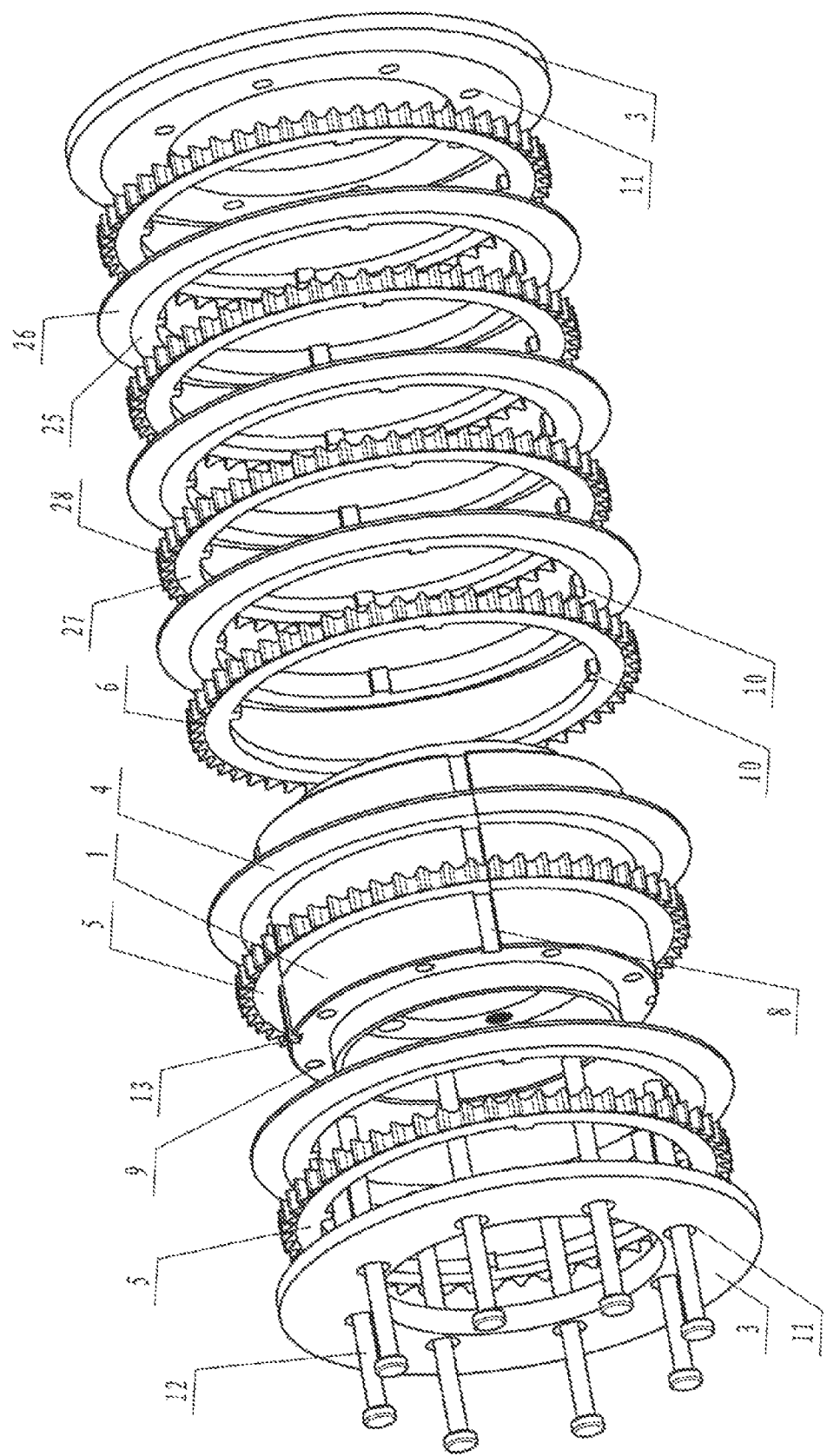
FIG. 2 is an exploded view according to embodiment 1 of the present invention.
Figure 5:
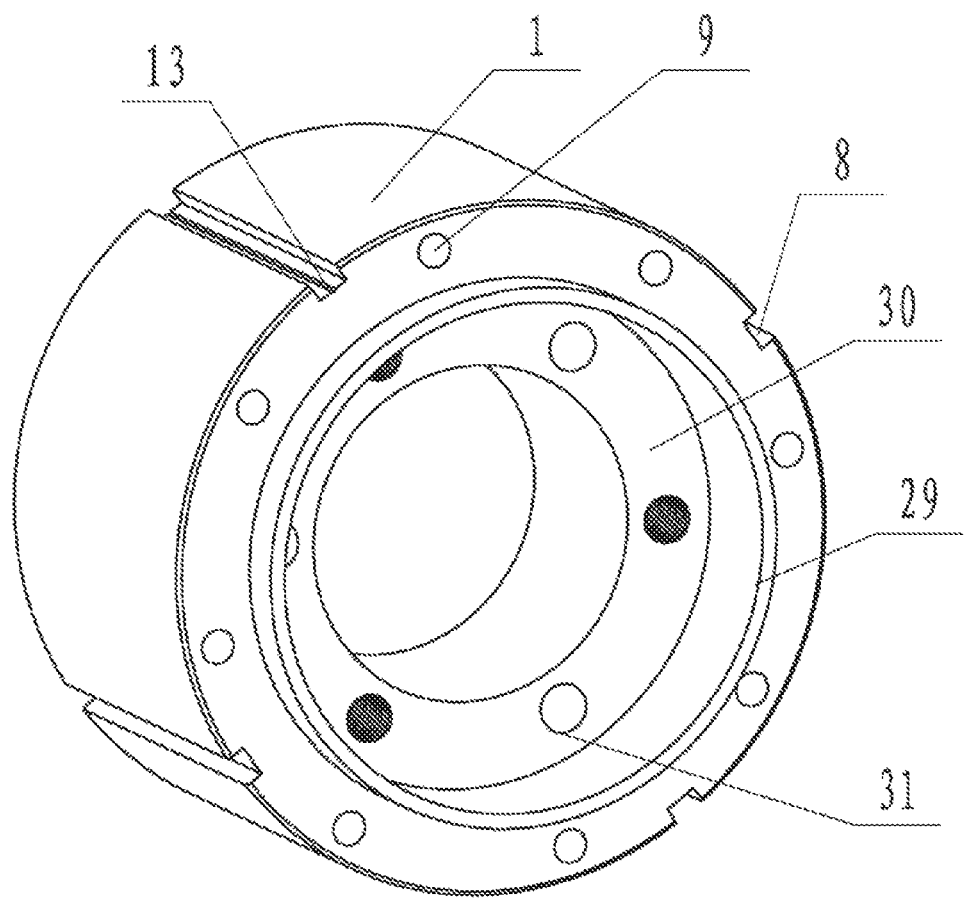
FIG. 5 is a schematic structural diagram of a pulley body according to embodiment 1 of the present invention.

A V-pulley (referring to FIG. 1, FIG. 2) includes a cylindrical pulley body 1. A through hole 2 is provided at the center of the pulley body. A positioning ring 29 is provided at each of two ends of the pulley body, respectively (referring to FIG. 5). The positioning rings are near the edges of the through hole and are coaxial with the through hole. The inner diameters of the positioning rings are consistent with the size of the hole diameter of the through hole. An annular protruding ring 30 protruding inward is provided on an inner wall of the through hole of the pulley body. The two ends of the protruding ring are disposed on inner sides of the two ends of the pulley body, respectively. The protruding ring and the pulley body are an integral structure. Six axial guiding holes 31 are evenly provided on an end surface of the protruding ring. Wheels are connected on the pulley body. The wheels include outer wheels 3 and inner wheels 4. An outer wheel is provided at each of two ends of the pulley body, respectively. Coaxial annular gears 5 and annular inner wheels are alternately arranged between the two outer wheels. The wheels are provided on both sides of each gear. The diameter of a gear is less than the diameter of an inner wheel. The outer wheels, the gears, and the inner wheels are fixedly connected through a connecting structure.

Figure 3:
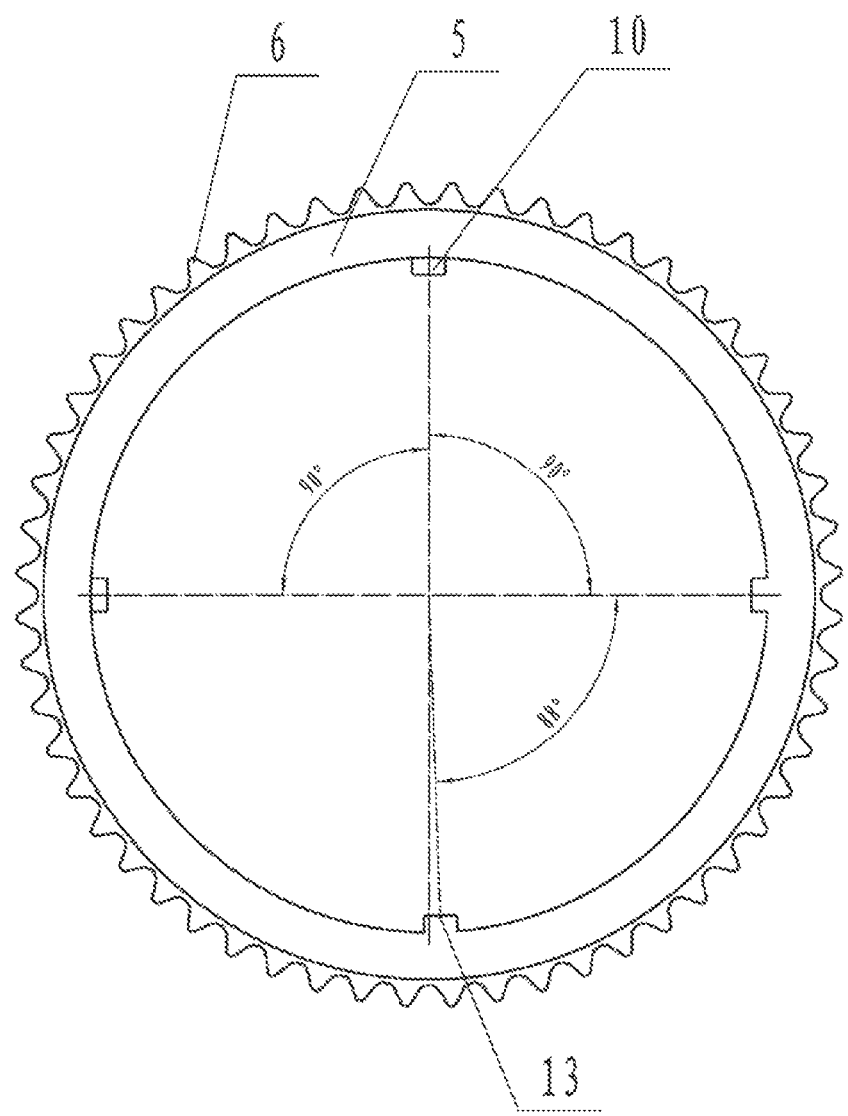
FIG. 3 is a schematic structural diagram of a gear according to embodiment 1 of the present invention.
Figure 4:
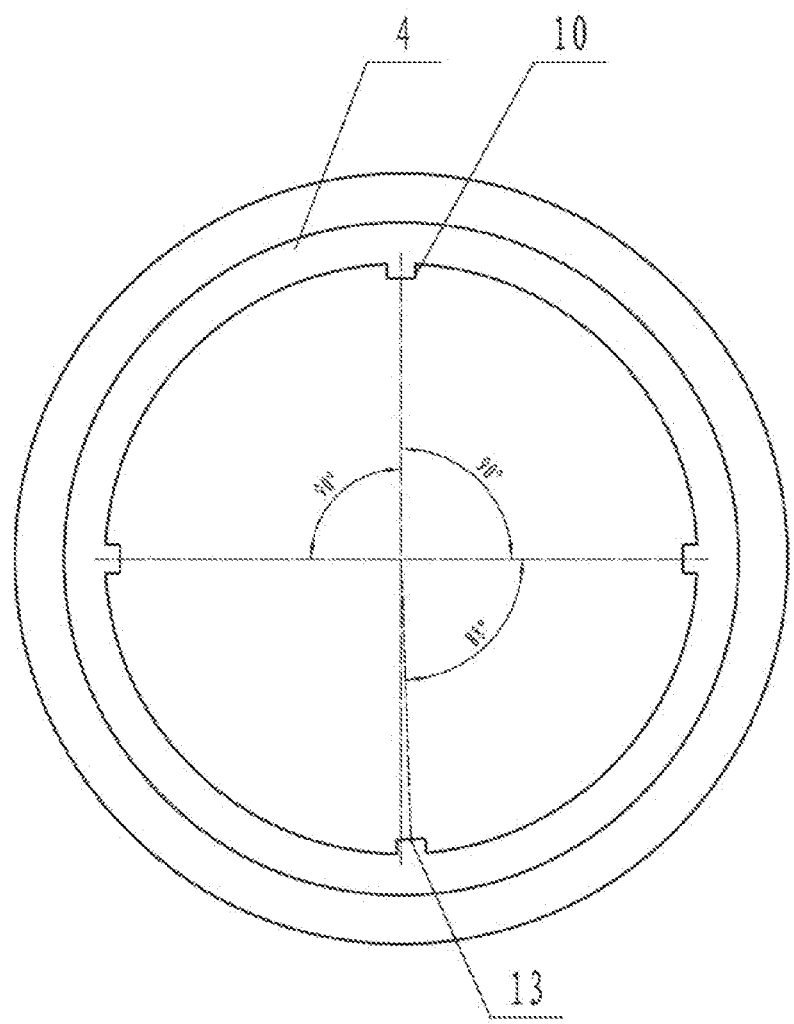
FIG. 4 is a schematic structural diagram of an inner wheel according to embodiment 1 of the present invention.

The connecting structure includes four connecting concave grooves 8 and eight connecting through holes 9 disposed on the pulley body, four bosses 10 disposed on the inner wheels and the gears, eight fixing holes 11 disposed on the outer wheels, and a connecting piece used for connection and fixation. The four connecting concave grooves are axially disposed on the outer wall of the pulley body. A first connecting concave groove and a second connecting concave groove are symmetrically disposed on a same diameter of a cross section perpendicular to an axis of the pulley body. A third connecting concave groove is disposed at a line of symmetry between the first connecting concave groove and the second connecting concave groove. A fourth connecting concave groove deviates by 2 degrees from the line of symmetry between the first connecting concave groove and the second connecting concave groove. That is, on a same cross section perpendicular to the axis of the pulley body, the fourth connecting concave groove and the third connecting concave groove have an included angle of 178 degrees to the center of the circle. The bosses and the connecting concave grooves are disposed in a one-to-one corresponding manner on inner circumferential surfaces of the gears and the inner wheels (referring to FIG. 3 and FIG. 4). Similarly, a first boss and a second boss are symmetrically disposed on a same diameter of a cross section perpendicular to an axis of the inner wheel or the gear. A third boss is disposed on a line of symmetry between the first boss and the second boss. A fourth boss deviates by two degrees from the line of symmetry between the first boss and the second boss. That is, on a same cross section perpendicular to the axis of the inner wheel or the gear, the fourth boss and the third boss have an included angle of 178 degrees to the center of the circle. The bosses and the connecting concave grooves are connected in a matching manner. A concave triangular mark groove 13 is provided at the groove bottom of the fourth connecting concave groove on the pulley body, and a concave triangular mark groove is provided on an end surface of a boss connected to the connecting concave groove with the mark groove in a matching manner. The fixing holes are correspondingly disposed on the end surfaces of the two outer wheels, and the eight fixing holes are evenly disposed. The connecting through holes are disposed on the pulley body and correspond to the fixing holes one by one. The eight connecting through holes are evenly disposed on an end surface of the pulley body. The connecting through holes and the connecting concave grooves have an included angle along an axial direction of the pulley body rather than being disposed in a same axial direction. Two connecting through holes are disposed between every adjacent two connecting concave grooves. The connecting piece is connected and fixed in the connecting through holes and the fixing holes. The connecting piece is a rivet 12. The rivet passes through the fixing hole of the outer wheel on the left end, penetrates the connecting through holes and the fixing hole of the outer wheel on the right end to reach the outer end of the outer wheel on the right end, and the two outer wheels are securely riveted on the pulley body.

The outer circumferential surfaces of the gears are provided with meshing teeth 6 disposed at an interval in a convex-concave manner. Two adjacent wheels and a gear located between the two adjacent wheels form a V shaped belt groove (V-belt groove) 7. The two end surfaces of the two adjacent wheels that are facing each other form friction transmission belt groove side surfaces. The gear between the two adjacent wheels forms a mesh transmission gear. The belt groove side surfaces are inclined smooth surfaces. The left and right end surfaces of the inner wheels include an annular wheel joining surface 25 and an annular wheel inclined surface 26 connected together. The end surfaces of the outer wheels adjacent to the gears include an annular wheel joining surface and an annular wheel inclined surface connected together. The wheel inclined surfaces form the belt groove side surfaces. The left and right end surfaces of the gears include an annular gear joining surface 27 and an annular gear inclined surface 28 connected together. The gear inclined surfaces are disposed on side surfaces of the meshing teeth of the gears. The gear joining surfaces and the wheel joining surfaces are both smooth surfaces and are joined together. The gear inclined surface is joined to a part of the wheel inclined surface near the position of a joining surface of the wheel. The structure enables the meshing teeth to be securely sandwiched between two end surfaces of the wheels, thereby ensuring the strength of the meshing teeth, and making the meshing teeth uneasy to deform. The pulley body is machined and manufactured using 45# steel. The outer wheels, the gears, and the inner wheels are all manufactured and machined in one manner of powder metallurgy, iron casting, and alloy steel casting. In this embodiment, the outer wheels, the gears, and the inner wheels are all manufactured by using a powder metallurgy process. 2 to 200 gears are connected on the pulley body. The pulley body, the outer wheels, the inner wheels, and the gears together form a 2-200-joined pulley. In this embodiment, six gears are connected on the pulley body. The pulley body, the outer wheels, the inner wheels, and the gears together form a six-joined pulley.

When the V-pulley is assembled and connected, the gears and the inner wheels are alternately sleeved on the pulley body. During sleeving, a boss with a mark groove on the gears and the inner wheels is correspondingly connected in a matching manner to the connecting concave groove with the mark groove on the pulley body. After all the inner wheels and the gears have been sleeved on the pulley body, the two outer wheels are sleeved on the positioning rings at the two ends of the pulley body, respectively, so that the fixing holes and the connecting through holes correspond to each other one by one and coincide axially. Finally, the outer wheels, the gears, and the inner wheels are securely connected and fixed on the pulley body through the rivet. Both end surfaces of the gears abut end surfaces of the wheels, thereby preventing axial displacement. The V-pulley is assembled and connected conveniently and fast.

Embodiment 2

Figure 6:
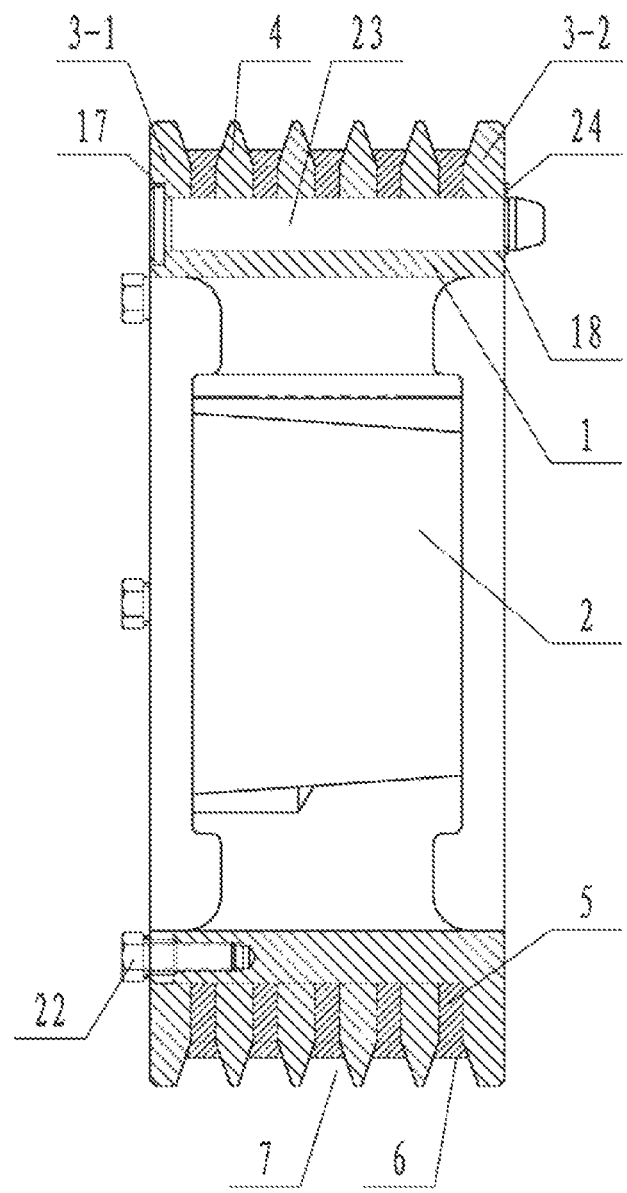
FIG. 6 is a sectional view according to embodiment 2 of the present invention.
Figure 10:
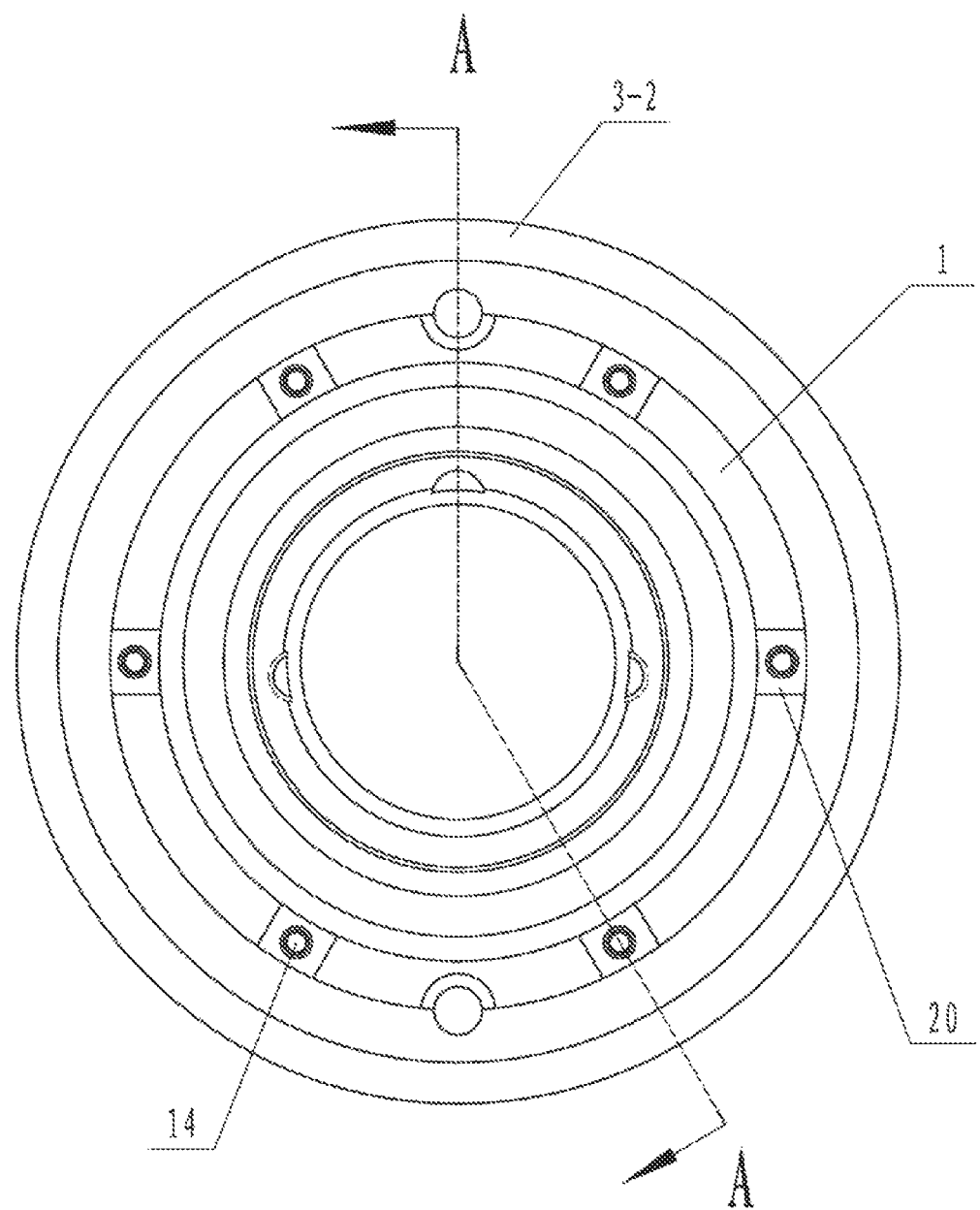
FIG. 10 is a schematic structural diagram of a pulley body according to embodiment 2 of the present invention.
Figure 11:
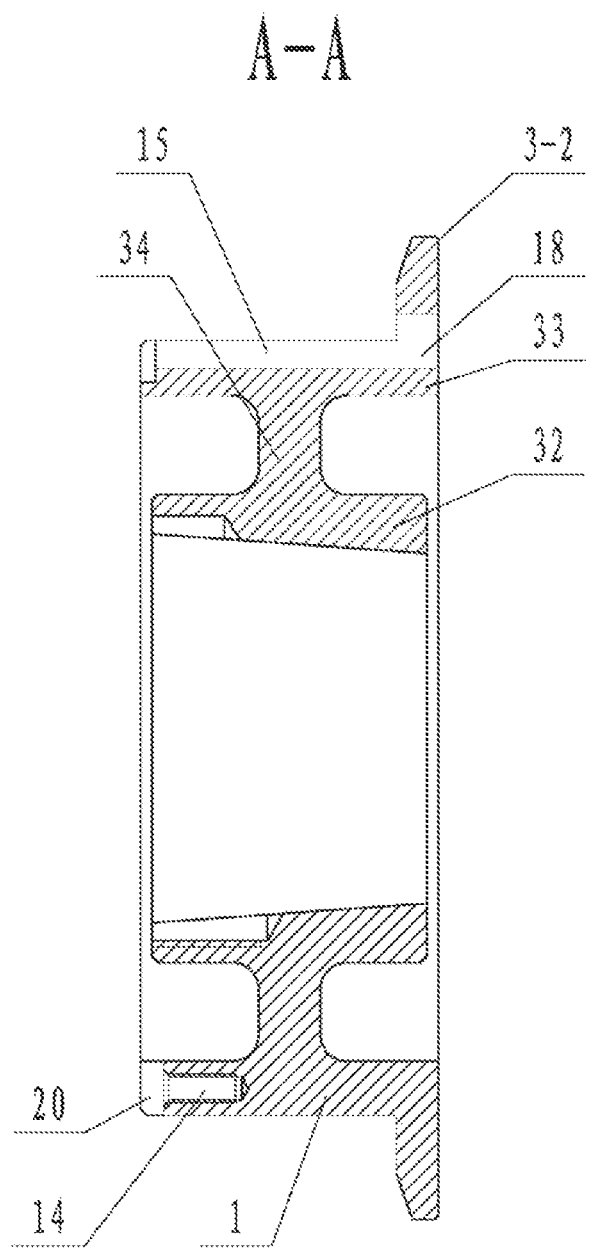
FIG. 11 is a sectional view along A-A in FIG. 10 of the present invention.

A V-pulley (referring to FIG. 6) includes a cylindrical pulley body 1 (referring to FIG. 10, FIG. 11). A through hole 2 is provided at the center of the pulley body. The pulley body includes coaxial inner annular bodies 32 and outer annular bodies 33. The inner annular bodies and the outer annular bodies are connected through six connecting ribs 34 evenly disposed. The left and right ends of the inner annular bodies are on inner sides of left and right ends of the outer annular bodies, respectively. The inner annular bodies, the connecting ribs, the outer annular bodies are connected together to be an integral structure. The inner holes of the inner annular bodies are used as the through hole of the pulley body. Wheels are connected on the pulley body. The wheels include outer wheels 3 and inner wheels 4. An outer wheel is provided at each of two ends of the pulley body, respectively. One of the two outer wheels is a first outer wheel 3-1, and the other is a second outer wheel 3-2. Coaxial annular gears 5 and annular inner wheels are alternately arranged between the two outer wheels. The wheels are provided on both sides of each gear. The diameter of a gear is less than the diameter of an inner wheel. The outer wheels, the gears, and the inner wheels are fixedly connected through a connecting structure.

Figure 7:
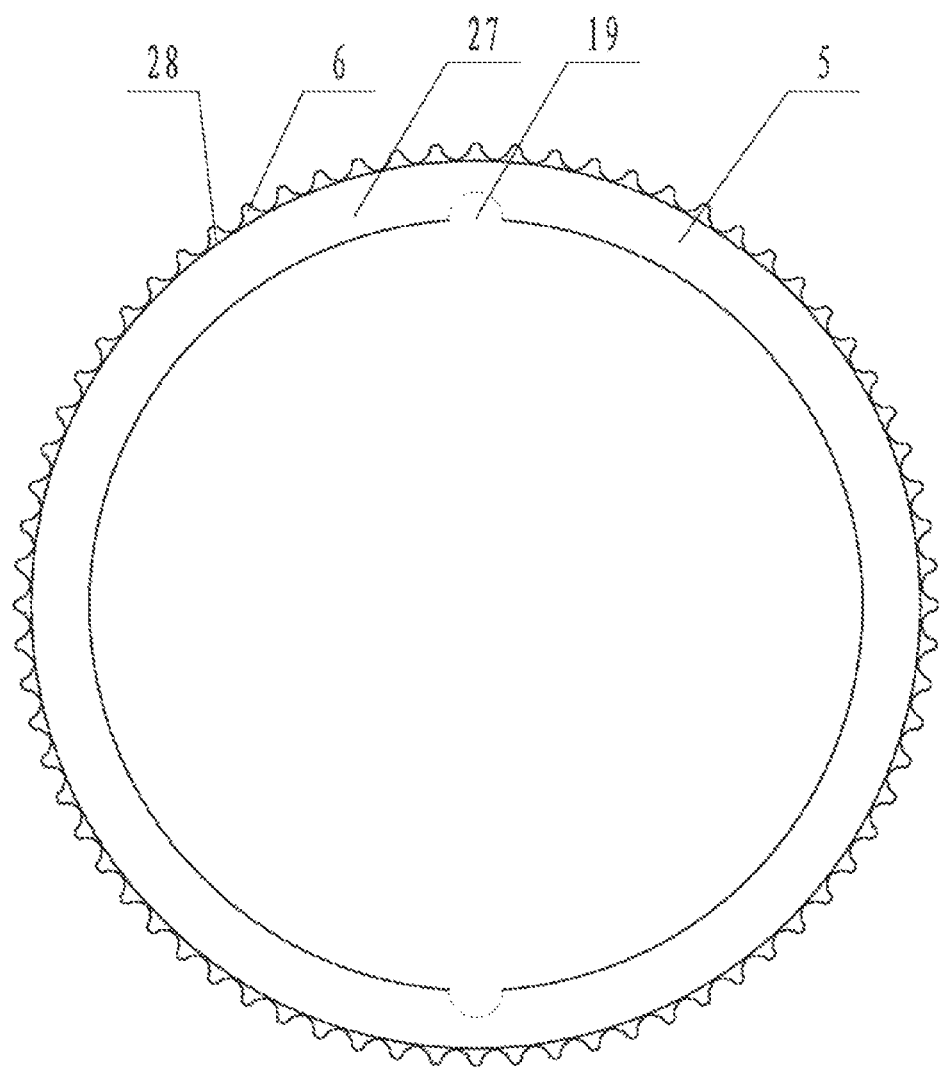
FIG. 7 is a schematic structural diagram of a gear according to embodiment 2 of the present invention.
Figure 8:
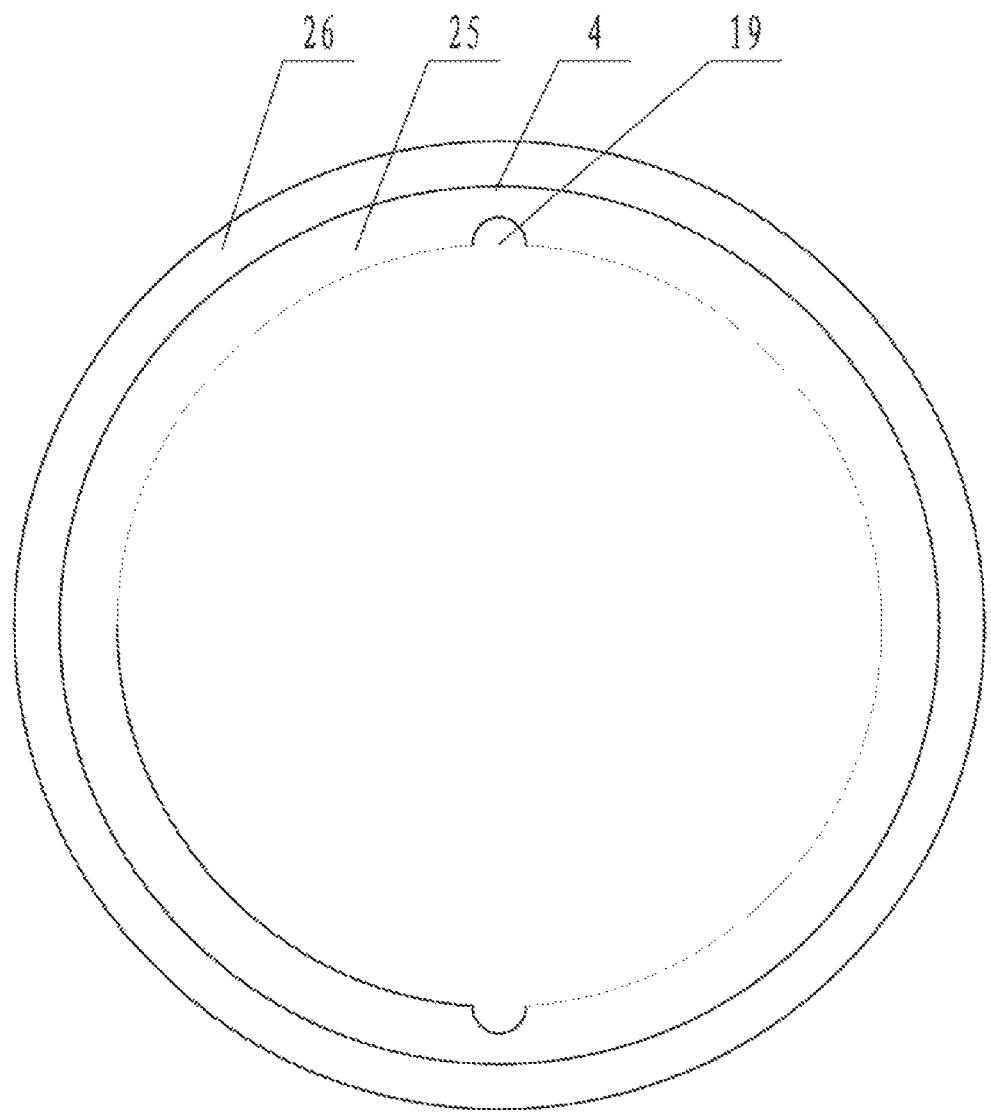
FIG. 8 is a schematic structural diagram of an inner wheel according to embodiment 2 of the present invention.
Figure 9:
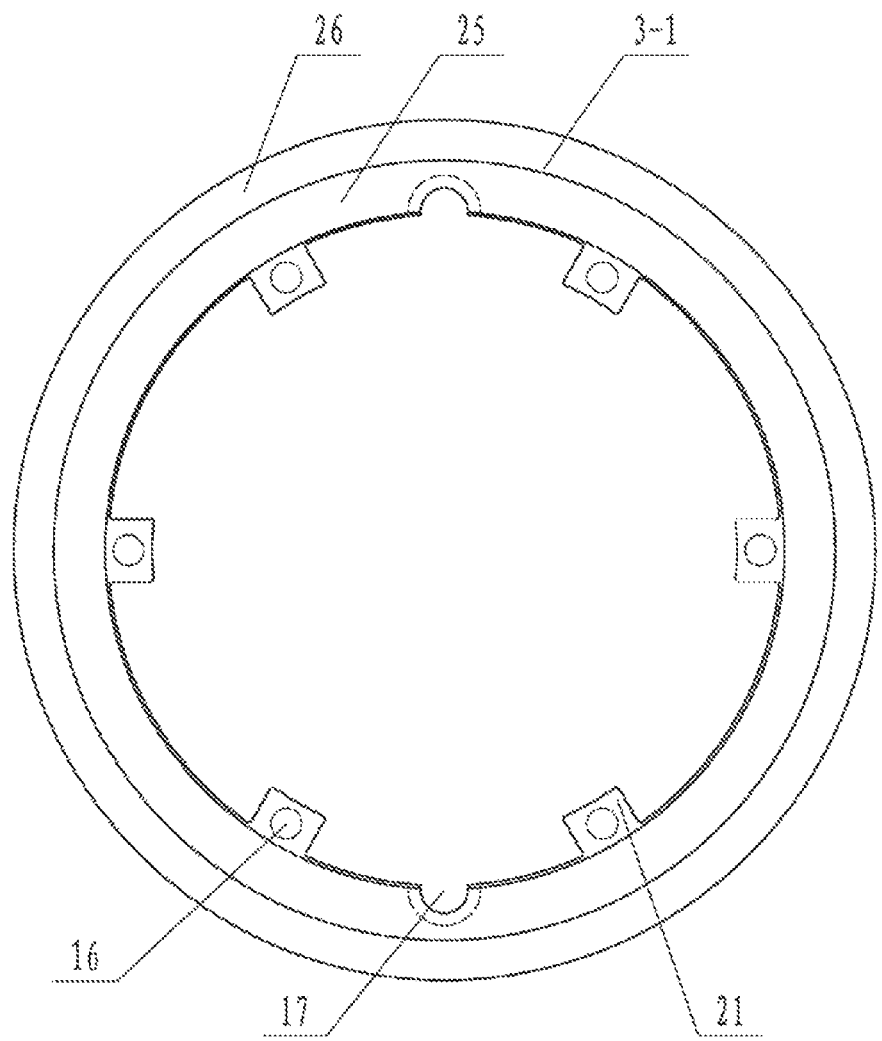
FIG. 9 is a schematic structural diagram of a first outer wheel according to embodiment 2 of the present invention.

The connecting structure includes six fixing holes 14 disposed on the pulley body and two wheel body through grooves 15, six connecting holes 16 and two positioning grooves 17 disposed on the first outer wheel (referring to FIG. 9), two positioning holes 18 disposed on the second outer wheel, two gear body through grooves 19 disposed on the inner wheels and the gears (referring to FIG. 7, FIG. 8), a connecting piece used for connection and fixation, and a positioning piece used for positioning. Six rectangular position limiting grooves 20 are provided on an end surface on a side of the pulley body. The position limiting grooves are disposed on end surfaces of the outer annular bodies and penetrate the inner walls and outer walls of the outer annular bodies. Six fixing holes are disposed on the bottom surfaces of the six position limiting grooves, respectively. Six rectangular connecting blocks 21 axially connected to the position limiting grooves in a matching manner are provided on an inner circle of the first outer wheel that is located on a side provided with the position limiting grooves of the pulley body. The six connecting holes are disposed on the six connecting blocks, respectively. The connecting piece is connected in the fixing holes and the connecting holes. The connecting piece is a fixing bolt 22. The first outer wheel is sleeved on the pulley body, so that the surface of the inner circle of the first outer wheel is joined to the outer walls of the outer annular bodies. The connecting blocks are connected in the position limiting grooves. The fixing holes and the connecting holes correspond to each other one by one and are coaxial. Next, the first outer wheel is connected and fixed on the pulley body through the fixing bolt being connected in the connecting holes and the fixing holes. The second outer wheel located on the other side of the pulley body is integrally formed with the pulley body. The wheel body through grooves and the gear body through grooves all have concave semi-circular shapes and are disposed opposite each other one by one to form circular through holes. The gears and wheels are all symmetrically provided with two semi-circular gear body through grooves. The two wheel body through grooves are symmetrically disposed on the pulley body. The two positioning grooves disposed on the first outer wheel are symmetrically disposed and have semi-circular countersink shapes. The positioning grooves are disposed at a middle position between the two adjacent connecting blocks on the inner circular surface of the first outer wheel. The end portions near the connection to the first outer wheel of the wheel body through grooves have semi-circular countersink shapes symmetrical with the positioning grooves. The positioning grooves, the wheel body through grooves, and the positioning holes are disposed in a one-to-one corresponding manner and are coaxial. The positioning piece is connected and disposed in the positioning grooves, the wheel body through grooves, and the positioning holes. The positioning piece is a positioning pin 23. During assembly and connection, the gears and the inner wheels are alternately sleeved on the pulley body, so that the gear body through grooves on the gears and the inner wheels sequentially coincide and are disposed opposite the wheel body through grooves on the pulley body. The first outer wheel is sleeved to the end portion of the pulley body, so that the six connecting holes are coaxial with the six fixing holes, respectively, and the positioning grooves and the gear body through grooves coincide. Next, the positioning pin is inserted in the positioning grooves. The positioning pin passes through the circular through groove formed of the gear body through grooves and the wheel body through grooves and the positioning holes to reach the outer end of the second outer wheel. A position limiting spring 24 is sleeved at a front end of the positioning pin, thereby preventing axial displacement of the positioning pin. Finally, the first outer wheel is fixedly connected on the pulley body through the fixing bolt.

The outer circumferential surfaces of the gears are provided with meshing teeth 6 disposed at an interval in a convex-concave manner. Two adjacent wheels and a gear located between the two adjacent wheels form a V-belt groove 7. The opposite end surfaces of the two adjacent wheels form friction transmission belt groove side surfaces. The gear between the two adjacent wheels forms a mesh transmission gear. The belt groove side surfaces are inclined smooth surfaces. The left and right end surfaces of the inner wheels include an annular wheel joining surface 25 and an annular wheel inclined surface 26 connected together. The end surfaces near the gears of the outer wheels include an annular wheel joining surface and an annular wheel inclined surface connected together. The wheel inclined surfaces form the belt groove side surfaces. The left and right end surfaces of the gears include an annular gear joining surface 27 and an annular gear inclined surface 28 connected together. The gear inclined surfaces are disposed on side surfaces of the meshing teeth of the gears. The gear joining surfaces and the wheel joining surfaces are both smooth surfaces and are joined together. The gear inclined surface is joined to a part of the wheel inclined surface near the position of a joining surface of the wheel. The structure enables the meshing teeth to be securely sandwiched between two end surfaces of the wheels, thereby ensuring the strength of the meshing teeth, and making the meshing teeth uneasy to deform. The pulley body is machined and manufactured by using 45# steel. The outer wheels, the gears, and the inner wheels are all manufactured and machined in one manner of powder metallurgy, iron casting, and alloy steel casting. In this embodiment, the outer wheels, the gears, and the inner wheels are all manufactured by using a powder metallurgy process. 2 to 200 gears are connected on the pulley body. The pulley body, the outer wheels, the inner wheels, and the gears together form a 2-200-joined pulley. In this embodiment, five gears are connected on the pulley body. The pulley body, the outer wheels, the inner wheels, and the gears together form a five joined pulley.

Embodiment 3

Figure 12:
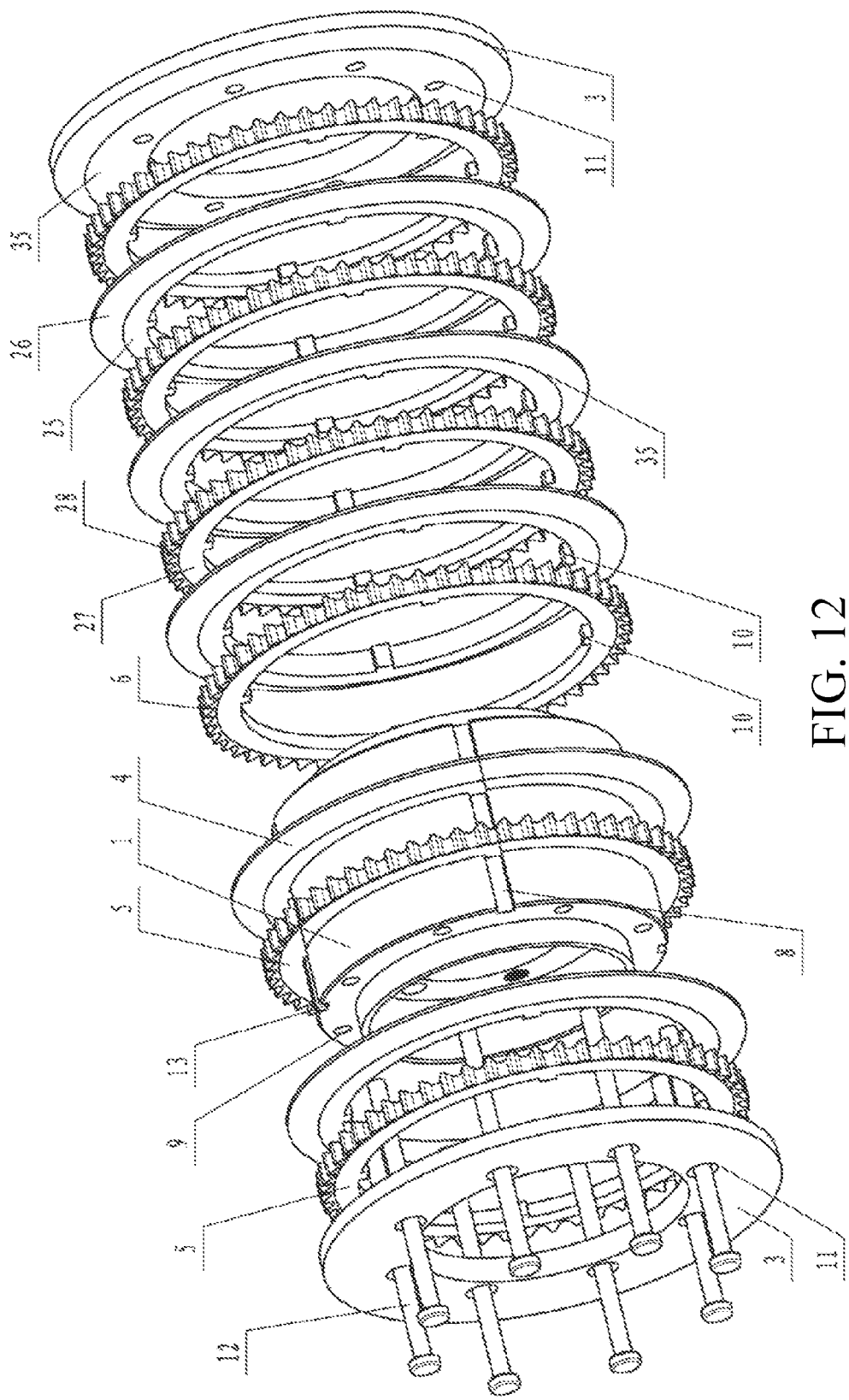
FIG. 12 is an exploded view of embodiment 3 of the present invention.
Figure 13:
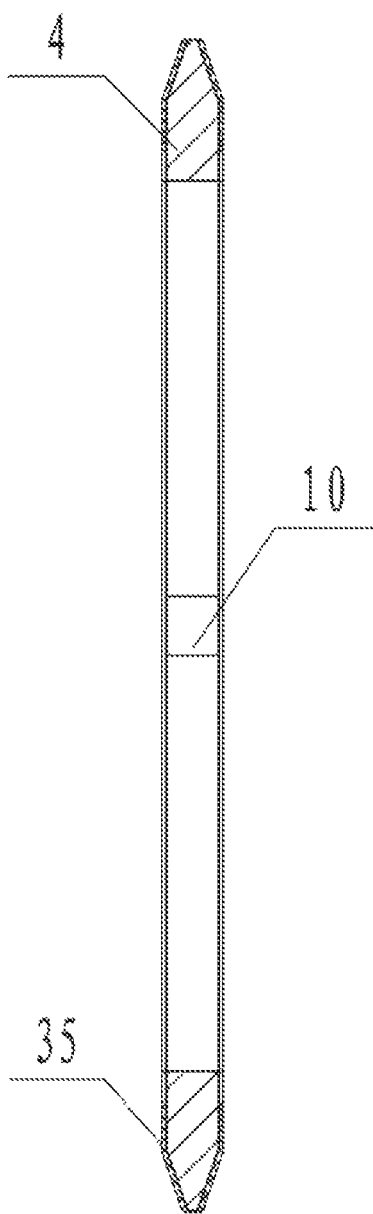
FIG. 13 is a schematic structural diagram of an inner wheel in FIG. 12.

As shown in FIG. 12 and FIG. 13, the differences from Embodiment 1 lie in: The outer circumferential surfaces of gears are provided with meshing teeth 6 disposed at an interval in a convex-concave manner. Two adjacent wheels and a gear located between the two adjacent wheels form a V-belt groove 7. The opposite end surfaces of the two adjacent wheels form friction transmission belt groove side surfaces. The gear between the two adjacent wheels forms a mesh transmission gear. A rough friction layer 35 is provided on both opposite end surfaces of adjacent wheels. The friction layer is machined by using a shot blasting process. The belt groove side surfaces are inclined smooth surfaces. The left and right end surfaces of the inner wheels include an annular wheel joining surface 25 and an annular wheel inclined surface 26 connected together. The end surfaces near the gears of the outer wheels include an annular wheel joining surface and an annular wheel inclined surface connected together. The wheel inclined surfaces form the belt groove side surfaces. The left and right end surfaces of the gears include an annular gear joining surface 27 and an annular gear inclined surface 28 connected together. The gear inclined surfaces are disposed on side surfaces of the meshing teeth of the gears. The gear joining surfaces and the wheel joining surfaces are both smooth surfaces and are joined together. The gear inclined surface is joined to a part of the wheel inclined surface near the position of a joining surface of the wheel. A friction layer is disposed on both the wheel joining surfaces and the wheel inclined surfaces. The structure enables the meshing teeth to be securely sandwiched between two end surfaces of the wheels, thereby ensuring the strength of the meshing teeth, and making the meshing teeth uneasy to deform. The pulley body is machined and manufactured by using 45# steel. The outer wheels, the gears, and the inner wheels are all manufactured and machined in one manner of powder metallurgy, iron casting, and alloy steel casting. In this embodiment, the outer wheels, the gears, and the inner wheels are all manufactured by using a powder metallurgy process. 2 to 200 gears are connected on the pulley body. The pulley body, the outer wheels, the inner wheels, and the gears together form a 2-200-joined pulley. In this embodiment, six gears are connected on the pulley body. The pulley body, the outer wheels, the inner wheels, and the gears together form a six-joined pulley.

What is claimed is:

1. A V-pulley, comprising:

a pulley body, having a through hole provided at the center of the pulley body; and wheels connected on the pulley body, comprising outer wheels and inner wheels, wherein an outer wheel is provided at each of two ends of the pulley body, respectively, coaxial annular gears and the annular inner wheels are alternately arranged between the two outer wheels, a diameter of the gears is less than a diameter of the inner wheels, and the outer wheels, the gears, and the inner wheels are fixedly connected through a connecting structure;

wherein outer circumferential surfaces of the gears are provided with meshing teeth disposed at an interval in a convex-concave manner, two adjacent wheels and the gear located between the two adjacent wheels form a V-belt groove, the opposite end surfaces of the two adjacent wheels form friction transmission belt groove side surfaces, the gear between the two adjacent wheels forms a mesh transmission gear, and the belt groove side surfaces are inclined smooth surfaces; and wherein the connecting structure comprises:

a plurality of connecting concave grooves and a plurality of connecting through holes disposed on the pulley body;

a plurality of bosses disposed on the inner wheels and the gears;

a plurality of fixing holes disposed on the outer wheels; and a connecting piece for connection and fixation, wherein the connecting concave grooves are axially disposed on the outer wall of the pulley body, the bosses and the connecting concave grooves are disposed in a one-to-one corresponding manner on inner circumferential surfaces of the gears and the inner wheels, the bosses and the connecting concave grooves are connected in a matching manner, the fixing holes are correspondingly disposed on end surfaces of the two outer wheels, the connecting through holes are disposed on the pulley body and correspond to the fixing holes one by one, and the connecting piece is connected and fixed in the connecting through holes and the fixing holes.

2. The V-pulley according to claim 1, wherein the connecting through holes are evenly disposed, the connecting piece is a rivet, and the connecting through holes and the connecting concave grooves have an included angle along an axial direction of the pulley body.

3. The V-pulley according to claim 1, wherein a concave triangular mark groove is provided at the groove bottom of one of the connecting concave grooves on the pulley body, and a concave triangular mark groove is provided on an end surface of a boss that is connected to the connecting concave groove with the mark groove in a matching manner.

4. The V-pulley according to claim 1, wherein the number of the connecting concave grooves disposed on the pulley body is four, a first connecting concave groove and a second connecting concave groove are symmetrically disposed on a same diameter of the pulley body, a third connecting concave groove is disposed at a line of symmetry between the first connecting concave groove and the second connecting concave groove, and a fourth connecting concave groove deviates by 1 to 5 degrees from the line of symmetry between the first connecting concave groove and the second connecting concave groove.

5. The V-pulley according to claim 1, wherein the outer wheels, the gears, and the inner wheels are all manufactured and machined in one manner of powder metallurgy, iron casting, and alloy steel casting.

6. The V-pulley according to claim 1, wherein two end surfaces of the inner wheels comprise an annular wheel joining surface and an annular wheel inclined surface connected together, end surfaces near the gears of the outer wheels comprise an annular wheel joining surface and an annular wheel inclined surface connected together, the wheel inclined surfaces form the belt groove side surfaces; and wherein two end surfaces of the gears comprise an annular gear joining surface and an annular gear inclined surface connected together, the gear inclined surfaces are disposed on side surfaces of the meshing teeth of the gears, the gear joining surfaces and the wheel joining surfaces are both smooth surfaces and are joined together, and the gear inclined surface is joined to a part of the wheel inclined surface near the position of a joining surface of the wheel.

7. The V-pulley according to claim 1, wherein 2 to 200 gears are connected on the pulley body, and the pulley body, the outer wheels, the inner wheels, and the gears together form a 2-200-joined pulley.

8. A V-pulley, comprising:

a pulley body, having a through hole provided at the center of the pulley body; and wheels connected on the pulley body, comprising outer wheels and inner wheels, wherein an outer wheel is provided at each of two ends of the pulley body, respectively, coaxial annular gears and the annular inner wheels are alternately arranged between the two outer wheels, a diameter of the gears is less than a diameter of the inner wheels, and the outer wheels, the gears, and the inner wheels are fixedly connected through a connecting structure;

wherein outer circumferential surfaces of the gears are provided with meshing teeth disposed at an interval in a convex-concave manner, two adjacent wheels and the gear located between the two adjacent wheels form a V-belt groove, the opposite end surfaces of the two adjacent wheels form friction transmission belt groove side surfaces, the gear between the two adjacent wheels forms a mesh transmission gear, and the belt groove side surfaces are inclined smooth surfaces;

wherein two end surfaces of the inner wheels comprise an annular wheel joining surface and an annular wheel inclined surface connected together, end surfaces near the gears of the outer wheels comprise an annular wheel joining surface and an annular wheel inclined surface connected together, the wheel inclined surfaces form the belt groove side surfaces; and wherein two end surfaces of the gears comprise an annular gear joining surface and an annular gear inclined surface connected together, the gear inclined surfaces are disposed on side surfaces of the meshing teeth of the gears, the gear joining surfaces and the wheel joining surfaces are both smooth surfaces and are joined together, and the gear inclined surface is joined to a part of the wheel inclined surface near the position of a joining surface of the wheel.

9. The V-pulley according to claim 8, wherein the outer wheels, the gears, and the inner wheels are all manufactured and machined in one manner of powder metallurgy, iron casting, and alloy steel casting.

10. The V-pulley according to claim 8, wherein 2 to 200 gears are connected on the pulley body, and the pulley body, the outer wheels, the inner wheels, and the gears together form a 2-200-joined pulley.

* * * * *